Oct. 20, 1936.    J. G. DYER    2,058,069
APPARATUS FOR CEMENTING OIL WELLS
Filed Aug. 5, 1935
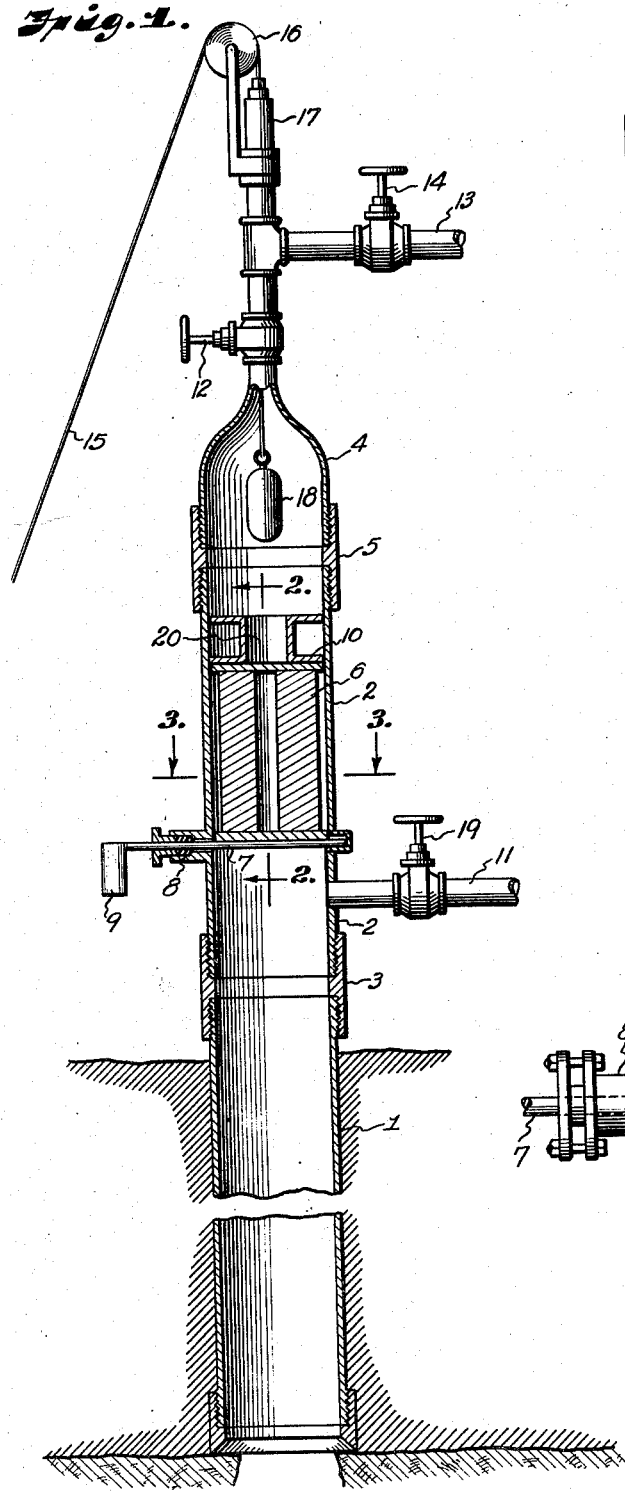
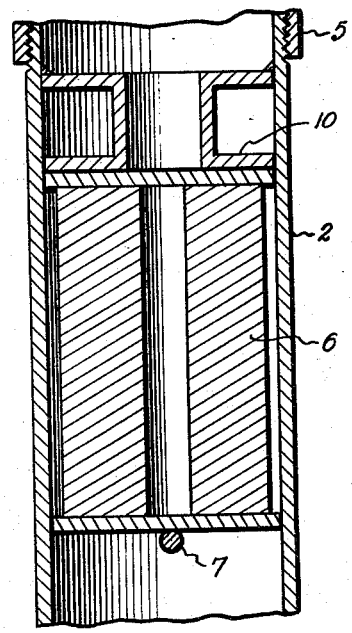
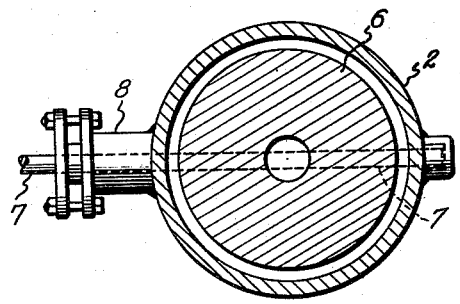
INVENTOR
Joseph G. Dyer
BY Thos. F. Peofield
ATTORNEY Patented Oct. 20, 1936

2,058,069

UNITED STATES PATENT OFFICE 2,058,069

APPARATUS FOR CEMENTING OIL WELLS

Joseph G. Dyer, Ponca City, Okla., assignor to Continental Oil Company, Ponca City, Okla., a corporation of Delaware Application August 5, 1935, Serial No. 34,763

1 Claim. (Cl. 166—21)

My invention relates to a method and apparatus for cementing oil wells.

In the present method of cementing oil wells, cement is pumped into the well at the casinghead and, after the required or calculated amount of cement has been pumped into the drill hole, the connections are broken at the casing collar and a cement plug is inserted into the casing, after which the connections are again made. Mud is then pumped in behind the plug at the top of the swedge fitting until the plug on top of the cement reaches a predetermined depth. This depth is usually ascertained by means of a measuring line which fits through a stuffing box at the top of the mud inlet. The measuring line carries a weight which follows the plug until it reaches the required depth at which time no further mud is pumped and the assembly is allowed to remain in a static condition until the cement sets.

The usual method as described above has been responsible for many failures in the cementing of deep wells. The time required to change the connections between the placing of the cement in the drill hole and the pumping in of the mud after the plug is inserted is often greater than one half hour. In deep holes, the temperature gradient increases as the depth and in many drill holes temperatures exist which will cause an initial setting of the cement in a very few minutes after it has been inserted. It will be apparent that a delay of one half hour before mud can be pumped in behind the cement plug to push the cement out of the casing will permit the cement to set in the pipe causing a complete failure of the cementing operations and rendering it necessary to incur the trouble, time and expense of drilling the cement which has set in the pipe, out of the well casing and recementing the drill hole. The top of the casing used in cementing is often from 10 to 15 feet above the derrick floor. The result is that the operation of breaking the connection and inserting the plug is hazardous.

In many cases where the swedge fitting is taken off the top of the casing after the cement has been pumped into the hole, a large volume of air will be drawn into the well due to the piston action of the mass of cement moving downwardly so that, when the solid block of cement is inserted, there will be a large volume of air between the top of the mass of cement in the pipe and the bottom of the plug. Since the plug forms rather a tight fitting piston within the pipe when the mud is pumped on top of the plug, the air will be forced into the cement and part of the cement which normally sets around the casing shoe will be porous with the result that it will not perform its function of making a good seal.

One object of my invention is to provide a method and apparatus of cementing an oil well, using a single plug in which it is unnecessary to break any connections in order to insert the plug on top of the mass of porous cement.

Another object of my invention is to provide a method and apparatus of cementing oil wells which will enable the plug to follow the mass of poured cement immediately, enabling the pumping of mud to begin without delay.

Other and further objects of my invention will appear from the following description.

In the accompanying drawing which forms part of the instant specification and are to be read in conjunction therewith and in which like reference numerals are used to indicate like parts in the various views, Figure 1 is a sectional elevation of a drill hole with a casing and fittings embodying one form of my invention and capable of carrying out the method of my invention.

Figure 2 is a fragmentary sectional view on an enlarged scale, taken along the line 2—2 of Figure 1.

Figure 3 is a sectional view taken along the line 3—3 of Figure 1.

In general, my invention contemplates the provision of a length of piping in which a cement plug is releasably held above the point of cement inlet and below the point of mud inlet. Means are provided for releasing the cement plug, thus held, after the desired amount of cement has been pumped into the well.

More particularly referring now to the drawing, the oil well casing 1 is provided with a casing nipple 2, secured to the casing by means of connecting collar 3. The swedge 4 is secured to the casing nipple 2 by means of a collar 5. Within the casing nipple 2, I house the cement plug 6 which is supported upon rod 7 which passes through the side of the nipple 2 through a stuffing box 8 and is provided with a handle 9. The plug 6 is placed in the nipple on top of the rod 7 prior to the time when cementing operations are started. An upper limit stop 10 is secured to the interior of the nipple 2 by welding or in any other suitable manner, to prevent the cement plug from being jammed into the swedge fitting when cement is being pumped through the cement inlet 11. The upper portion of swedge 4 is provided with a shutoff valve 12, and a mud inlet line 13 which is controlled by valve 14. A measuring line 15 passes into the swedge over pulley 16 through a stuffing box 17 and is provided with a weight 18.

The cement plug is assembled in the nipple 2 before the nipple is placed in the casing collar 3.

In operation, the valve 19 is opened and the valve 14 is closed. Cement is pumped from a conventional mixing device into the well casing. After the required amount of cement is placed in the hole, rod 7 is pulled outwardly by means of handle 9, valve 19 is closed and valve 14 is opened, permitting mud to be pumped in through pipe 13, forcing the plug 6 down the hole to a position on top of the cement, causing the cement to be pushed outside the pipe where it is allowed to set and form a seal between the pipe and the formation. The measuring line 15 is fed into the hole through the opening 20 in the upper limit stop 10.

It will be observed that I have accomplished the objects of my invention and that, by the use of the apparatus and method described, no great delay will occur between the time when a sufficient quantity of cement has been pumped into the well and the time that the plug is placed on top of the cement and forced downwardly by the mud. Furthermore, the use of my apparatus and method obviates the necessity of breaking well head connections with the attendant danger and disadvantage.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

In an oil well cementing assembly, an oil well casing, a casinghead, a plug, means for removably positioning said plug in said casinghead, an annular stop within said casinghead for limiting the upward motion of said plug, an inlet connection to said casinghead communicating therewith below said plug for passing cement into the well, an inlet connection to said casinghead communicating therewith above said plug for passing mud into said well, a measuring line passing into said casinghead, a weight on the end of said measuring line, said weight being adapted to pass through said annular stop.

JOSEPH G. DYER.